United States Patent Office 3,374,236
Patented Mar. 19, 1968

3,374,236
QUATERNARY 5-AMMONIUMMETHYL-4-AMINO-2 - ALKYLMERCAPTOALKYLENE PYRIMIDINE SALTS
Renat Herbert Mizzoni, Long Valley, and George de Stevens, Summit, N.J., assignors to Ciba Corporation, New York, N.Y., a corporation of Delaware
No Drawing. Filed Aug. 23, 1965, Ser. No. 481,897
9 Claims. (Cl. 260—256.5)

The invention concerns and has for its object the provision of quaternary 5-ammoniummethyl-4-amino-2-lower alkylmercapto-lower alkyl-pyrimidine salts in which ammonium nitrogen atom is part of a mono- or bicyclic heterocyclic aryl radical, as well as methods for their preparation.

More particularly this invention relates to compounds having the formula

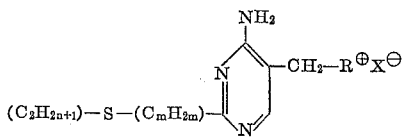

in which each of $n$ and $m$ stands for an integer from 1 to 7, $R^\oplus$ stands for an ammonium group of which the nitrogen atom is part of a mono- or bicyclic heterocyclic aryl radical containing up to 3 hetero atoms, and $X^\ominus$ for the anion of an acid, the corresponding sulfoxides and sulfones and acid addition salts of these compounds.

The moiety $-C_nH_{2n+1}$ represents, for example, methyl, ethyl, linear or branched propyl, butyl, pentyl, hexyl or heptyl linked with the sulfur atom in any desired position. The moiety $-C_mH_{2m}-$ represents, for example, methylene, 1,1- or 1,2-ethylene, 1,1-, 2,2-, 1,2- or 1,3-propylene, 1,1-, 2,2-, 1,2-, 1,3-, 1,4- or 2,3-butylene, 1,1-, 2,2-, 3,3-, or 2,3-pentylene, 2,2-dimethyl-1,3-propylene, 3,4-hexylene or 3,5-heptylene.

The ammonium group $R^\oplus$ represents, for example a pyridinium, quinolinium, isoquinolinium, pyradazinium, pyramidinium, pyrazinium, quinazolinium, phthalazinium, 1,5-, 1,6-, 1,7- or 1,8-naphthyridinium, N-lower alkyl-N'-pyrazolinium, N-lower alkyl-N'-imidazolinium, thiazolinium, oxazolinium, 1,3,5-triazinium, 1-lower alkyl-1H-pyrrolo [3,2-b] pyridinium, 6-lower alkyl-6H-pyrrolo [3,4-b] pyridinium, thieno [3,2-b] pyridinium, thieno [2,3-b] pyridinium, pyrido [3,2-d] pyrimidinium or pyrido [2,3-b] pyrazinium radical.

The above mentioned aromatic radicals may be unsubstituted or substituted by one or more than one of the same or of different substituents, for example, lower alkyl groups, such as those mentioned above, free or functionally converted hydroxy or mercapto groups, such as methoxy, ethoxy, methyl or ethylmercapto, halogen, e.g. fluoro, chloro or bromo, trifluoromethyl or amino, especially di-lower alkylamino, e.g. dimethylamino or diethylamino.

The anion $X^\ominus$ as well as the acid addition salts mentioned in the beginning, are preferably derived from therapeutically useful inorganic or organic acids, such as hydrohalic acids, e.g. hydrochloric or hydrobromic acid, sulfuric, phosphoric, nitric or perchloric acid, aliphatic, alicyclic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, p-aminobenzoic, anthranilic, p-hydroxybenzoic, salicyclic, p-aminosalicyclic, embonic, methanesulfonic, ethanesulfonic, hydroxyethanesulfonic, ethylenesulfonic, halobenzenesulfonic, toluenesulfonic, naphthalenesulfonic or sulfanilic acid, methionine, tryptophane, lysine or arginine.

The compounds of this invention possess valuable pharmacological properties. For example, they exhibit anti-protozoal activity, especially against parasites causing coccidiosis, such as *Eimeria tenella, acervulina, adenoides, agridis, brunetti, hagani, maxima* and *necatrix.* This can be demonstrated, for example, by the curative effect of a feed, containing about 0.001 to about 0.02% of the compounds of this invention, given to chickens one day prior till 8 days after their inocuation with sporulated oocysts of *Eimeria tenella.* The compounds of this invention are, therefore, useful agents in the control of coccidiosis, which is one of the most important goals in the poultry raising industry. Furthermore, they are useful intermediates in the manufacture of other valuable compounds, especially medicines.

Particularly useful are compounds of the formula

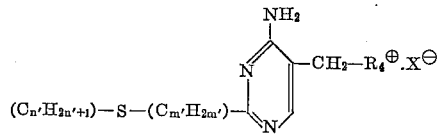

in which each of $m'$ and $n'$ stands for an integer from 1 to 4, $R_4^\oplus$ stands for a pyridinium, quinolinium, isoquinolinium, pyridazinium, pyrimidinium, pyrazinium, thiazollinium or oxazolinium radical and $X^\ominus$ for the anion of an acid, the corresponding sulfoxides and sulfones, and acid addition salts of these compounds.

Of special value are the compounds of the formula

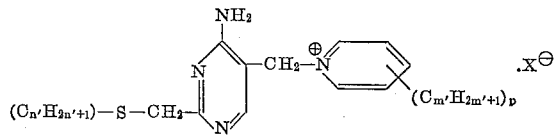

in which each of $m'$ and $n'$ stands for an integer from 1 to 4, p for an integer from 0 to 2 and $X^\ominus$ for the anion of an acid, and acid addition salts thereof.

The compounds of the invention are prepared by methods in themselves known. Advantageously they are obtained by reacting a reactive ester of a 5-hydroxymethyl-4-amino-2-lower alkylmercapto-lower alkyl-pyrimidine, its corresponding sulfoxide or sulfone, with a mono- or bicyclic heterocyclic aromatic compound containing at east one ring-nitrogen atom and, if desired, converting a resulting free compound into an acid addition salt thereof or converting a resulting acid addition salt into the free compound or into another salt.

A reactive ester of said 5-hydroxymethyl compound is, for example, that of a strong inorganic or organic acid, such as a hydrohalic, sulfuric or sulfonic acid, e.g. hydrochloric, hydrobromic, sulfuric or lower alkyl sulfuric acid, or a lower alkane or benzene sulfonic acid, e.g. methane, ethane, benzene or p-toluene sulfonic acid.

The above reaction is carried out according to standard methods, in the presence or absence of diluents, preferably such as are inert to the reagents and are solvents thereof, of catalysts and/or inert atmospheres, at low tempeartures, room temperature or advantageously elevated temperatures, at atmospheric or superatmospheric pressure.

The compounds of the invention are obtained in the free form, for example in that having a free 4-amino group, or in the form of their acid addition salts, depending on the conditions under which the process is carried out; these salts are also included in the present invention. Acid addition salts that are obtained can be converted into the free compounds in known manner, for example, with weak alkalis, e.g. alkali metal carbonates or bicarbonates, or into other salts, for example with ion exchangers. Free compounds that are obtained can be converted into acid addition salts by reacting them with inorganic or organic acids, especially those that are suitable for the formation of therapeutically useful salts, for example those listed above.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly those starting materials should be used in the reactions of the invention that lead to the formation of those compounds indicated above as being especially valuable.

The starting materials are known or, if they are new, may be prepared by methods in themselves known. Thus, for example, the 5-hydroxymethyl-4-amino-2-lower alkyl-mercapto-lower alkylpyrimidines may be prepared by reacting a lower alkylmercapto-lower alkanoic acid amidine with a lower alkoxymethylidene-malodinitrile, reducing the resulting 5-cyano-4-amino-2-lower alkylmercapto-lower alkyl-pyrimidine to the corresponding 5-aminomethyl compound, for example with lithium aluminum hydride, and converting it into the corresponding 5-hydroxymethyl compound, for example by the action of nitrous acid. Said alcohol can be reactively esterified according to known methods, for example with a thionylhalide or phosphorus halide, a sulfuric or sulfonic acid halide e.g. sulfuryl, tosyl or brosyl chloride.

The compounds of the invention may be used, for example in the form of veterinary compositions, animal feedingstuffs or additives to feedingstuffs, which are a further object of the present invention. The former contain said compounds in admixture with organic or inorganic, solid or liquid pharmaceutical excipients suitable especially for enteral administration. Suitable excipients are substances that do not react with the new compounds, for example water, gelatine, lactose, starch, stearyl alcohol, magnesium stearate, talc, vegetable oils, benzyl alcohol, gums, propylene glycol and other known medicinal excipients. The compositions may be, for example, tablets or pills, or in liquid form as solutions, suspensions or emulsions. They may be sterilized and/or contain adjuvants such as preserving, stabilizing, wetting or emulsifying agents, solution promoters, salts for regulating the osmotic pressure or buffers. They are prepared by conventional methods.

The feedingstuffs and additives for feedingstuffs or for the drinking water contain the compounds of the invention together with conventional extenders, diluents and/or nutrients, such as sucrose, glucose, molasses, fermentation residues, corn-meal, ground and rolled oats, wheat shorts and middlings, meat scrap, oil cake, soybean and fish meal, alfalfa, clover, grass clippings and the like, mineral supplements, such as bone meal, calcium carbonate, iodized salt and the like, vitamins, such as vitamins A, B, C and D and other suitable substances, such as preservants, e.g. benzoic acid. The feedingstuffs contain the compounds of the invention in an amount ranging between about 0.0001 and 0.1% preferably between about 0.001 and 0.02%, whereas the additives may contain the pure substances, when used, for example, for the drinking water, but usually contain between about 1 and 50% thereof. The amount of the compounds of the invention administered via the veterinary compositions or the drinking water corresponds to that given with the medicated feedingstuffs shown above. The compositions, feedingstuffs and additives may contain other therapeutically valuable substances, for example antibiotics, e.g. penicillin or terramycin, antiparasitic agents, e.g. methyl 4-acetamino-2-ethoxy-benzoate and/or tranquilizers, such as reserpine or methyl 18-epi-O-methyl-reserpate.

The following examples illustrate the invention, temperatures are given in degrees centrigrade and all parts wherever given are parts by weight.

*Example 1*

2.1 g. 5 - hydroxymethyl-4-amino-2-methylmercapto-methylpyrimidine are dissolved in 12 ml. redistilled 2-picoline (B.P. 121–123°) and to the solution 2.15 g. p-toluenesulfonyl chloride are added while stirring. The reaction mixture is allowed to stand at room temperature for 36 hours. It is then diluted with diethyl ether whereby a gummy solid separates. The excess picoline is removed by decanting the supernatant liquid, redissolving the solid in isopropanol and reprecipitating it 4 times with diethyl ether. The so-obtained 5-(2-methyl-pyridinium)-methyl-4-amino-2-methylmercaptomethyl-pyrimidine tosylate is finally dissolved in 100 ml. 0.06 N hydrochloric acid and the solution is passed through Amberlite IRA 400 in the chloride form. The eluate is concentrated on the steam bath yielding the 5-(2-methyl-pyridinium)-methyl-4-amino-2-methylmercaptomethyl-pyrimidine chloride hydrochloride of the formula

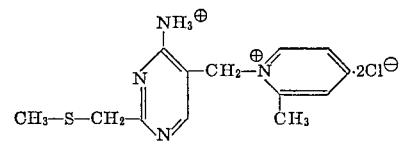

It shows in the U.V.-spectrum bands at 237 and 267 mμ.

The starting material is prepared as follows:

Through the mixture of 107.0 methylmercapto-acetonitrile, 72.5 ml. anhydrous ethanol and 300 ml. diethyl ether, anhydrous hydrogen chloride is bubbled until the uptake of 46.0 g. thereof is noted. The solid formed is filtered off after cooling and washed with anhydrous diethyl ether. The so-obtained methylmercapto-acetic acid imino-ethylester hydrochloride is suspended in 75 ml. anhydrous ethanol and the solution treated with 175 ml. 7.2 N ethanolic ammonia. After stirring at room temperature for 7 hours, the solution is maintained at this temperature overnight. It is filtered, the filtrate concentrated in vacuo and the residual crystals filtered off to yield the methylmercapto-acetic acid amidine hydrochloride.

The mixture of 126.0 g. thereof and 800 ml. anhydrous ethanol is added to a solution of sodium ethylate prepared from 19.9 g. sodium and 850 ml. anhydrous ethanol, whereby the temperature is maintained at —5°. The separated salt is removed by filtration and the filtrate is added dropwise within 1 hour to a stirred solution of ethoxymethylidene-malodinitrile in 900 ml. anhydrous ethanol at —5° and stirring is continued for additional 2¼ hours. The product is filtered, washed with ethanol and dried in vacuo at 50° to yield the 5-cyano-4-amino-2-methylmercaptomethyl-pyrimidine.

The mixture of 18.0 g. thereof and 250 ml. tetrahydrofuran is added dropwise within one hour to a stirred suspension of 7.2 g. lithium aluminum hydride in 100 ml. tetrahydrofuran at room temperature and stirring is continued for 18 hours. Hereupon 21.6 ml. ethyl acetate, 7.2 ml. water, 14.4 ml. 15% aqueous sodium hydroxide and 21.6 ml. water are added in this order and the mixture obtained is filtered. The filtrate is concentrated in vacuo, the residue dissolved in anhydrous ethanol and the solution acidified with ethanolic hydrochloric acid in the cold. The product is precipitated by addition of diethyl ether, filtered off and recrystallized from 95% ethanol to yield the 5-aminomethyl-4-amino-2-methylmercaptomethyl-pyrimidine dihydrochloride.

To a solution of 28.0 g. thereof in 400 ml. water the solution of 7.5 g. sodium nitrite in 400 ml. water is added over a 3 hour period whereby the temperature is maintained at 50–55°. The homogeneous solution is stirred for 17 hours at said temperature during which time the pH is adjusted gradually to about 7.5–8 with saturated sodium carbonate solution. The reaction mixture is evaporated to dryness. The residue extracted with 4 portions of boiling 90% aqueous acetone, the solution concentrated to a small volume and remaining water is removed azeotropically with ethanol. The solution is filtered, the filtrate acidified to a pH of about 4 with ethanolic hydrochloric acid and then diluted with diethyl ether. After standing for a short time, the precipitated solid is filtered, ground in a mortar with diethyl ether, filtered and vacuum dried at 50° to yield the 5-hydroxy-methyl-4-amino-2-methylmercaptomethyl-pyrimidine hydrochloride.

The hydrochloride obtained is dissolved in the minimum amount of water and solid potassium carbonate is added while cooling and stirring until an oily layer separates. It is extracted with n-butanol until the last extract is virtually colorless. The combined extracts are dried over potassium carbonate, filtered and evaporated in vacuo. The residue is triturated with diethyl ether, filtered, washed with diethyl ether and dried in vacuo at 50° to yield the 5-hydroxymethyl-4-amino-2-methylmercaptomethyl-pyrimidine.

*Example 2*

2.2 g. 5 - hydroxymethyl - 4-amino-2-methylmercaptomethyl-pyrimidine are dissolved in 15 ml. of freshly distilled 2,4-lutidine, and to this solution 2.24 g. p-toluenesulfonyl chloride are added. The mixture is allowed to stand at room temperature for 4 days. It is then diluted with diethyl ether to yield a mass of somewhat gummy crystals. The supernatant solution is decanted, the residue dissolved in isopropanol and the product 4 times precipitated with diethyl ether until the odor of 2,4-lutidine disappears. The crystalline 5-(2,4-dimethyl-pyridinium)-methyl - 4 - amino - 2-methylmercaptomethyl-pyrimidine tosylate is dissolved in 100 ml. water and the solution acidified with 0.1 N hydrochloric acid. This solution is passed through an Amberlite IRA 400 resin column present in the chloride form. The aqueous eluate is concentrated in vacuo and the residue recrystallized from methanol-isopropanol to yield the 5-(2,4-dimethyl-pyridinium)-methyl - 4 - amino - 2-methylmercaptomethyl-pyrimidine chloride hydrochloride of the formula

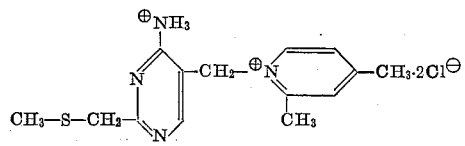

the NMR-Δ-values thereof are inter alia 3.60, 5.18, 6.20 and 3.35 p.p.m.

*Example 3*

In the manner described in the previous examples, the following compounds may be prepared by using the equivalent amounts of the corresponding starting materials:

5 - (2 - methyl-5-ethyl-pyridinium)-methyl-4-amino-2-methylmercaptomethyl - pyrimidine chloride hydrochloride, 5-(4-methyl-pyridazinium)-methyl-4-amino-2-methylmercaptomethyl-pyrimidine chloride hydrochloride and the 5-(4-methyl-5-ethyl-thiazolinium)-methyl-4-amino-2-methylmercaptomethyl - pyrimidine tosylate, 5 - quinoliniummethyl - 4 - amino - 2-methylmercaptomethyl-pyrimidine tosylate, 5-isoquinoliniummethyl-4-amino-2-methyl-mercaptomethyl-pyrimidine tosylate, 5-pyridaziniummethyl-4-amino-2-methylmercaptomethyl-pyrimidine tosylate, 5 - pyrimidiniummethyl-4-amino-2-methylmercaptomethyl-pyrimidine chloride hydrochloride, 5-pyraziniummethyl-4-amino-2-methylmercaptomethyl-pyrimidine chloride hydrochloride, 5 - thiazoliniummethyl-4-amino-2-methylmercaptomethyl-pyrimidine tosylate, 5-oxazoliniummethyl-4-amino-2-methylmercaptomethyl-pyrimidine tosylate, 5 - (5,6-dimethoxy-quinolinium)-methyl-4-amino-2-methylmercaptomethyl - pyrimidine tosylate, 5 - quinaldinium-methyl-4-amino-2-methylmercaptomethyl-pyrimidine tosylate, 5 - lepidiniummethyl - 4-amino-2-methylmercaptomethyl-pyrimidine tosylate, 5-(1-methyl-isoquinolinium)-methyl-4-amino-2-methylmercaptomethyl-pyrimidine tosylate, 5 - (2,6-dimethyl-4-methoxy-pyridinium)-methyl-4-amino-2-methylmercaptomethyl-pyrimidine tosylate, 5-(2,4 - dimethyl - oxazolinium)-methyl-4-amino-2-methylmercaptomethyl-pyrimidine chloride hydrochloride, 5-(3-chloro - pyridinium)-methyl-4-amino-2-methylmercaptomethyl-pyrimidine chloride hydrochloride or 5-(3-dimethylamino - pyridinium) - methyl-4-amino-2-methylmercaptomethyl-pyrimidine chloride hydrochloride. From the compounds mentioned in this and the previous examples the corresponding analogs may be prepared containing instead of the methylmercaptomethyl group in 2-position an ethylmercaptomethyl, n- or i-propylmercaptomethyl, 2-methylmercapto-ethyl, 2-ethylmercapto-ethyl or 2-n-propylmercapto-ethyl group in said position by replacing the methylmercapto-acetonitrile, used as starting material, by the equivalent amount of ethyl-, n- or i-propylmercapto-acetonitrile or β-methyl-, ethyl or n-propylmercapto-propionitrile respectively.

*Example 4*

A poultry feed containing 0.005% of the active ingredient may be prepared as follows:

| Premix: | Grams |
|---|---|
| 5 - (2,4 - dimethyl-pyridinium)-methyl-4-amino - 2 - methylmercaptomethyl-pyrimidine chloride hydrochloride | 5.00 |
| Wheat standard middlings (30–80 mesh) | 9,995.00 |

The ingredients are mixed thoroughly until uniformity is obtained.

| Feed formula: | Grams |
|---|---|
| Corn meal | 1,062.875 |
| Fat | 80.000 |
| Fish meal, 60% protein | 100.000 |
| Soybean meal, 50% protein | 500.000 |
| Corn gluten meal | 100.000 |
| Dehydrated alfalfa meal | 50.000 |
| Corn distiller's solubles | 40.000 |
| Di-calcium phosphate | 28.000 |
| Calcium carbonate | 20.000 |
| Iodized salt | 10.000 |
| Vitamins A and D (1,000,000 int. units A and 250,000 D/pound) | 4.000 |
| Calcium pantothenate | 0.250 |
| Butylated hydroxytoluene | 0.250 |
| Choline chloride, 25% | 2.500 |
| Riboflavin conc. (24 g. per pound) | 0.125 |
| Vitamin $B_{12}$ (0.02 g. per pound) | 1.000 |
| Methionine | 0.500 |
| Manganese sulfate | 0.500 |
| Total weight | 2,000.000 |

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish, soybean, corn gluten and alfalfa meal and the corn distiller solubles. After a uniform mixture has been obtained, vitamins A and D, calcium pantothenate, choline chloride, riboflavin, vitamin $B_{12}$ and methionine are added in that order. Mixing is continued after the addition of butylated hydroxytoluene, and maintained until a uniform product is obtained.

The premix is added to the feed formula prepared as described above in an amount sufficient to provide a concentration of 0.005 g. of the active ingredient per 100 g. of feed in the uniformly blended mix.

Another premix which may be used accordingly is the following:

| | Grams |
|---|---|
| 5 - (2-methyl - pyridinium) - methyl - 4-amino-2-methylmercaptomethyl-pyrimidine chloride hydrochloride | 23.00 |
| Confectioner's sugar | 100.00 |
| Solvent extracted soybean meal | 877.00 |

*Example 5*

Additive for drinking water:

| | Grams |
|---|---|
| 5 - (2,4 - dimethyl-pyridinium)methyl-4-amino-2-methylmercaptomethyl-pyrimidine chloride hydrochloride | 30.00 |
| Tetrasodium ethylenediamine-tetracetic acid | 30.00 |
| Citric acid | 70.00 |
| Sodium citrate | 50.00 |
| Confectioner's sugar | 120.00 |

An aqueous solution containing 0.01% of the active ingredient may be prepared from said additive.

What is claimed is:

1. A member selected from the group consisting of a compound having the formula

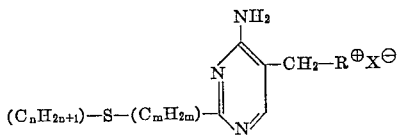

in which each of $n$ and $m$ stands for an integer from 1 to 7, $R^\oplus$ stands for a member selected from the group consisting of pyridinium, quinolinium, isoquinolinium, pyridazinium, pyrimidinium, pyrazinium, thiazolinium and oxazolinium and such radical substituted by lower alkyl and $X^\ominus$ for the anion of a therapeutically useful acid, its sulfoxide and sulfone and a therapeutically useful acid addition salt of these compounds.

2. A member selected from the group consisting of a compound having the formula

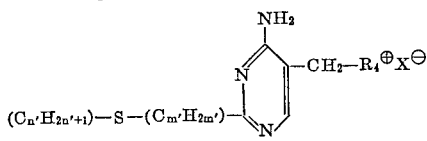

in which each of $m'$ and $n'$ stands for an integer from 1 to 4, $R_4^\oplus$ for a member selected from the group consisting of pyridinium and pyridinium substituted by lower alkyl and $X^\ominus$ for the anion of a therapeutically useful acid, and a therapeutically useful acid addition salt thereof.

3. A member selected from the group consisting of a compound having the formula

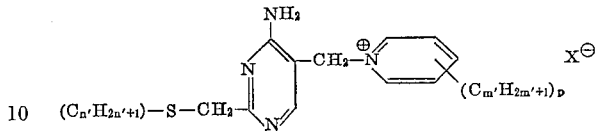

in which each of $m'$ and $n'$ stands for an integer from 1 to 4, $p$ for an integer from 0 to 2 and $X^\ominus$ for the anion of a therapeutically useful acid, and a therapeutically useful acid addition salt thereof.

4. A 5-(2-methyl-pyridinium)-methyl-4-amino-2-methylmercaptomethyl-pyrimidine salt of therapeutically useful acid.

5. 5 - (2 - methyl-pyridinium)-methyl-4-amino-2-methylmercaptomethyl-pyrimidine tosylate.

6. 5 - (2 - methyl-pyridinium)-methyl-4-amino-2-methylmercaptomethyl-pyrimidine chloride hydrochloride.

7. A 5 - (2,4-dimethyl-pyridinium)-methyl-4-amino-2-methylmercaptomethyl-pyrimidine salt of a therapeutically useful acid.

8. 5 - (2,4 - dimethyl - pyridinium)-methyl-4-amino-2-methylmercaptomethyl-pyrimidine tosylate.

9. 5 - (2,4 - dimethyl - pyridinium)-methyl-4-amino-2-methylmercaptomethyl - pyrimidine chloride hydrochloride.

References Cited

UNITED STATES PATENTS

| | | | |
|---|---|---|---|
| 2,824,088 | 2/1958 | Neher | 260—79.3 |
| 3,020,277 | 2/1962 | Rogers et al. | 260—256.4 |
| 3,030,364 | 4/1962 | Rogers et al. | 260—256.4 |
| 3,030,365 | 4/1962 | Rogers et al. | 260—256.4 |
| 3,088,867 | 5/1963 | Rogers et al. | 260—256.5 X |
| 3,097,138 | 7/1963 | Cavallini et al. | 167—53.1 |
| 3,155,572 | 11/1964 | Rogers et al. | 260—256.4 X |
| 3,218,309 | 11/1965 | Elslager et al. | 260—152 |

OTHER REFERENCES

Burger, Medicinal Chemistry, 2nd ed., Interscience Publishers, Inc., New York, 1960, pages 74–75, 77–78.

ALEX MAZEL, *Primary Examiner.*

N. S. RIZZO, *Examiner.*

M. U. O'BRIEN, R. GALLAGHER,
*Assistant Examiners.*